US012790568B2

(12) United States Patent
Ortiz

(10) Patent No.: US 12,790,568 B2
(45) Date of Patent: Nov. 10, 2026

(54) ALKYL SULFONIC ACID COMPOSITIONS COMPRISING SOLVENT USEFUL IN DESCALING APPLICATIONS

(71) Applicant: JELMAR LLC, Skokie, IL (US)

(72) Inventor: Rafael Ortiz, Skokie, IL (US)

(73) Assignee: JELMAR LLC, Skokie, IL (US)

( * ) Notice: Subject to any disclaimer, the term of this patent is extended or adjusted under 35 U.S.C. 154(b) by 217 days.

(21) Appl. No.: 18/758,252

(22) Filed: Jun. 28, 2024

(65) Prior Publication Data

US 2025/0002820 A1 Jan. 2, 2025

Related U.S. Application Data

(60) Provisional application No. 63/511,158, filed on Jun. 29, 2023, provisional application No. 63/553,256, filed on Feb. 14, 2024.

(51) Int. Cl.

| | |
|---|---|
| ***C11D 3/00*** | (2006.01) |
| ***C11D 1/83*** | (2006.01) |
| ***C11D 1/94*** | (2006.01) |
| ***C11D 3/04*** | (2006.01) |
| ***C11D 3/20*** | (2006.01) |
| ***C11D 3/22*** | (2006.01) |
| ***C11D 3/28*** | (2006.01) |
| ***C11D 3/33*** | (2006.01) |
| ***C11D 3/34*** | (2006.01) |
| ***C11D 3/43*** | (2006.01) |
| *C11D 1/14* | (2006.01) |
| *C11D 1/72* | (2006.01) |
| *C11D 1/75* | (2006.01) |

(52) U.S. Cl.

CPC .............. *C11D 3/3463* (2013.01); *C11D 1/83* (2013.01); *C11D 1/94* (2013.01); *C11D 3/042* (2013.01); *C11D 3/2068* (2013.01); *C11D 3/2086* (2013.01); *C11D 3/221* (2013.01); *C11D 3/28* (2013.01); *C11D 3/33* (2013.01); *C11D 3/43* (2013.01); *C11D 1/146* (2013.01); *C11D 1/72* (2013.01); *C11D 1/75* (2013.01)

(58) Field of Classification Search

CPC ........... C11D 3/3463; C11D 1/83; C11D 1/94; C11D 3/042; C11D 3/2068; C11D 3/2086; C11D 3/221; C11D 3/28; C11D 3/33; C11D 3/43; C11D 1/146; C11D 1/72; C11D 1/75; C11D 1/88; C11D 1/92; C11D 3/2075; C11D 3/3409

USPC .......................................................... 510/253

See application file for complete search history.

(56) References Cited

U.S. PATENT DOCUMENTS

| | | | | |
|---|---|---|---|---|
| 5,294,644 | A | 3/1994 | Login et al. | |
| 6,391,841 | B1 * | 5/2002 | Durbut | C11D 3/2041 510/421 |
| 7,501,027 | B2 | 3/2009 | Ahmed et al. | |
| 8,475,370 | B2 | 7/2013 | Mccombie et al. | |
| 8,574,370 | B2 | 11/2013 | Laffitte et al. | |
| 8,648,026 | B2 | 2/2014 | Borst et al. | |
| 8,722,609 | B2 | 5/2014 | Choczaj et al. | |
| 9,340,755 | B2 | 5/2016 | Gaudreault | |
| 11,421,191 | B1 * | 8/2022 | Soontravanich | C11D 3/042 |
| 2005/0239676 | A1 | 10/2005 | Gaudreault | |
| 2013/0303430 | A1 | 11/2013 | Garcia et al. | |
| 2015/0218489 | A1 * | 8/2015 | Man | C11D 3/362 564/291 |
| 2019/0376005 | A1 * | 12/2019 | Piorkowski | C11D 1/22 |
| 2020/0199764 | A1 | 6/2020 | Renaud et al. | |
| 2023/0018865 | A1 * | 1/2023 | Braeckman | C11D 11/0094 |

FOREIGN PATENT DOCUMENTS

| | | | |
|---|---|---|---|
| CN | 111705323 | 9/2020 | |
| CN | 114540822 | 5/2022 | |
| EP | 0656417 | 6/1995 | |
| EP | 3286354 | 2/2018 | |
| FR | 2920435 | 3/2009 | |
| JP | 2013216832 | 10/2013 | |
| JP | 2015500922 | 1/2015 | |
| JP | 2023503048 A * | 1/2023 | C11D 3/2013 |
| MX | PA99010108 | 9/2000 | |
| NL | 2027192 | 7/2022 | |
| RU | 2604366 | 12/2016 | |
| WO | WO2006029823 | 3/2006 | |
| WO | WO2007036497 | 4/2007 | |
| WO | WO2010045686 | 4/2010 | |
| WO | WO 2012145688 A1 * | 10/2012 | C11D 7/265 |
| WO | WO2013080043 | 6/2013 | |
| WO | WO2015077737 | 5/2015 | |
| WO | WO2020124196 | 6/2020 | |

OTHER PUBLICATIONS

International Search Report and Written Opinion for PCT/US2024/036005 dated Aug. 27, 2024, 8 pp.

Basheva, et al., "Role of Betaine as Foam Booster in the Presence of Silicone Oil Drops," Langmuir, vol. 16, No. 3, 2000, 14 pp.

* cited by examiner

*Primary Examiner* — Eisa B Elhilo

(74) *Attorney, Agent, or Firm* — Neal, Gerber & Eisenberg LLP

(57) ABSTRACT

The present disclosure relates to a composition for use in descaling applications, particularly industrial cleaning applications, and preferably hard surface cleaning applications. The composition of the present disclosure is an aqueous liquid solution comprising an acidic component, a non-water solvent and a surfactant system. The acidic component of the present disclosure at least comprises one or more alkyl sulfonic acids.

23 Claims, No Drawings

ALKYL SULFONIC ACID COMPOSITIONS COMPRISING SOLVENT USEFUL IN DESCALING APPLICATIONS

PRIORITY CLAIM

The present application claims priority to U.S. Patent Application No. 63/511,158, filed Jun. 29, 2023, and U.S. Patent Application No. 63/553,256, filed Feb. 14, 2024, the contents of which are hereby incorporated by reference in their entirety.

FIELD OF INVENTION

This application relates generally to a descaling composition comprising one or more alkyl sulfonic acids.

BACKGROUND

The 2020 Covid pandemic had a significant effect on consumer's cleaning expectations for both household and industrial cleaning products. Consumers are cleaning more often and are more critical of the product cleaning performance. In industrial cleaning, significant labor shortages means there is less time allocated for cleaning further requiring products to work even more effectively, preferably be ready-to-use (RTU), or as dilutable concentrates, and safe to the user and the environment. Hard surfaces accumulate a number of soils over time. One exemplary soil is calcium carbonate, also referred to as limescale, which can be deposited on the surface from aqueous solutions containing solubilized ions. Other soils can be rust, struvite deposits. Limescale can be a substrate for microorganisms and should be removed to avoid unhygienic conditions. Typically, limescale is removed by applying an acidic solution to the hard surface. However, prior art acidic compositions typically require a high concentration of acid, which can pose a risk to the user if the composition contacts skin or is ingested. These prior art acid compositions also can be associated with toxic fumes. Other prior art cleaning compositions comprising an alkyl sulfonic acid have suboptimal cleaning properties due to the other components (e.g., surfactants) in the compositions.

Thus, there is a need for more effective, safe, concentrated descaling compositions that are ready-to-use (RTU), effectively removes limescale to a greater degree than prior art compositions and avoids the generation of toxic fumes and is safe for the user to apply.

SUMMARY

The present disclosure describes an acidic composition comprising an acidic component, a non-water solvent and a surfactant system that has been shown to be a particularly effective descaler. The acidic component comprises one or more alkyl sulfonic acids and, optionally, one or more organic acids. Particularly suitable alkyl sulfonic acids include C1-C6 alkyl sulfonic acids, such as methanesulfonic acid. Particularly suitable organic acids include lactic acid, formic acid, butyric acid, valeric acid, caproic acid, itaconic acid, oxalic acid, terephthalic acid, citric acid, acetic acid, malonic acid, maleic acid, succinic acid, hydroxyl succinic acid, adipic acid, octanoic acid, fumaric acid, itaconic acid, methacrylic acid, sulfamic acid, methylsulfamic acid, propionic acid, gluconic acid, glutamic acid, glutaric acid, glucaric acid, benzoic acid, tartaric acid, hydroxyacetic acid, and salicylic acid. The relative amount of the acidic component will vary based on whether the composition is formulated as a ready-to-use or concentrated formulation. In ready-to-use formulations, the acidic component may comprise 0.1 to about 45 wt. % of the total composition; and in concentrated formulations, the acidic component may be up to about 95 wt. % (e.g., 45 to 95 wt. %) of the total composition.

The surfactant system may comprise one or more anionic surfactants, one or more nonionic surfactants, one or more amphoteric surfactants, or a mixture thereof. Alkyl sulfates, in particular sodium 2-ethylhexyl sulfate, is a suitable anionic surfactant. Alcohol ethoxylates, in particular shorter chain alcohol ethoxylates, such as C6, C7, C8, or C9 alcohol ethoxylates, are suitable nonionic surfactants. Alkylether hydroxypropyl sultaine or disodium capryllampho dipropionate are suitable amphoteric surfactants. Alkyldiphenyloxide disulfonate is another suitable surfactant.

The non-water solvent may comprise one or more glycols, including glycol ethers, such as a mixture of tripropylene glycol monobutyl ether, polypropylene glycol monobutyl ether, tripropylene glycol, and dipropylene glycol n-butylether.

The composition may optionally further comprise a wetting agent, thickener, and/or a chelant. The amount of chelating agent(s) in the composition may range from about 0.01 wt % to about 10 wt %.

The composition of the present disclosure may also include one or more auxiliary agents selected from the group consisting of thickeners, UV protectants, rust inhibitors, preservatives, dyes, fragrances, and colorants.

DETAILED DESCRIPTION

The description that follows describes, illustrates, and exemplifies one or more particular embodiments of an acidic descaling composition comprising one or more alkyl sulfonic acids and methods of use thereof. This description is not provided to limit the disclosure to the embodiments described herein, but rather to explain and teach various principles to enable one of ordinary skill in the art to understand these principles and, with that understanding, be able to apply them to practice not only the embodiments described herein, but also other embodiments that may come to mind in accordance with these principles. The scope of the instant disclosure is intended to cover all such embodiments that may fall within the scope of the appended claims, either literally or under the doctrine of equivalents.

As used herein, "about" refers to a deviation of plus or minus 10%. Thus, a disclosure referring to "about 10," for example, shall encompass the inclusive range of 9 to 11. Similarly, a range of about 1 to about 10, for example, shall encompass an inclusive range of 0.9 to 11.

As used herein "lacks" means the composition does not contain any of the component "lacking." In other words, the composition comprises 0.000% of the lacking component.

The composition of the present disclosure is a composition comprising an acidic component, a non-water solvent and a surfactant system. In preferred embodiments, the composition is an aqueous liquid composition. The composition may further comprise a chelant and/or a wetting agent. It has been surprisingly found that the composition described herein is effective cleaning compositions, particularly for descaling, even sloped surfaces where the contact time with the cleaning agent may be limited due to gravity. As detailed herein, the components of the present composition have a synergistic effect on cleaning performance.

The acidic component of the present disclosure comprises one or more alkyl sulfonic acids. The alkyl sulfonic acid may be a short chain alkyl sulfonic acid. The alkyl sulfonic acid may be a C1-C6 alkyl sulfonic acid, such as methanesulfonic acid or ethanesulfonic acid. The alkyl sulfonic acid may be linear or branched. The acidic component may comprise or consist of methanesulfonic acid. In embodiments, the acidic component further comprises one or more organic acids. Suitable organic acids for use in the acidic component comprising one or more alkyl sulfonic acids include lactic acid, formic acid, butyric acid, valeric acid, caproic acid, itaconic acid, oxalic acid, terephthalic acid, citric acid, acetic acid, malonic acid, maleic acid, succinic acid, hydroxyl succinic acid, adipic acid, octanoic acid, fumaric acid, itaconic acid, methacrylic acid, sulfamic acid, methylsulfamic acid, propionic acid, gluconic acid, glutamic acid, glucaric acid, benzoic acid, tartaric acid, hydroxyacetic acid, and salicylic acid. In embodiments, the acidic component lacks any organic acid not recited in the aforementioned list. In preferred embodiments, one or two organic acids, in addition to the one or more alkyl sulfonic acids, are present. In embodiments, the acidic component lacks an inorganic acid, such as phosphoric acid.

The acidic component in the total composition should be in sufficient amount such that the pH of the total composition is 0 to about 4, preferably 0 to about 2, or 0 to 1. In certain ready-to-use embodiments, the acidic component comprises about 0.1 to about 45; 10 to about 45; 15 to about 45; 25 to 45; 35 to 45; 20 to 45; 30 to 45; 0.1 to 43; 10 to about 43; 15 to about 43; 20 to about 43; 25 to 43; 25 to 35; 0.1 to 30; 5 to about 30; 10 to about 30; 0.1 to 20; 5 to about 20; 0.1 to about 10; or 0.1 to 10 wt. % of the total composition. One skilled in the art would readily appreciate that these ready-to-use embodiments may be suitable for a concentrated product depending on the intended use case. In embodiments, concentrates may comprise an acidic component greater than 10 wt %. In particular embodiments where the acidic component is intended to be diluted (i.e., concentrated compositions), the acidic component comprises about 45 to about 95; 45 to 95; 45 to about 80; 45 to 80; 45 to about 70; 45 to 70; 45 to about 60; 45 to 60; 45 to about 50; 45 to 50; 50 to about 95; 50 to 95; 55 to about 95; 55 to 95; 60 to about 95; 60 to 95; 65 to about 95; 65 to 95; 70 to 95; 70 to about 95; 75 to about 95; or 75 to 95 wt. % of the total composition. In other embodiments, the weight percentage of the acidic component is greater than the weight percentage of the surfactant system. For example, the weight percentage ratio of the acidic component relative to the surfactant system may be greater than 2:1, greater than 4:1, greater than 8:1, greater than 15:1, greater than 50:1, greater than 100:1, greater than 150:1, greater than 200:1, or alternatively, between 50:1 and 500:1, between 100:1 and 400:1, between 200:1 and 300:1, or about 250:1.

The present inventor has surprisingly found that optimizing the surfactant system used with the acidic component is key to achieving superior cleaning performance. The present surfactant system may comprise one or more anionic surfactants, one or more nonionic surfactants, and/or one or more amphoteric surfactants. The surfactant system may comprise 0.01 to about 10; 0.01 to 10; 0.01 to about 5; 0.01 to 5; 0.01 to about 2.5; 0.01 to 2.5; 0.01 to about 1.0; 0.01 to 1.0; about 0.01 to about 0.25; 0.01 to about 0.25; 0.05 to 0.25; 0.05 to 0.20; 0.05 to 0.15; 0.075 to 0.125; or 0.01 to 0.25 wt. % of the total composition. In preferred embodiments, the surfactant system contains one or more low-foaming surfactants.

Suitable anionic surfactants include an alkyl sulfate, such as sodium 2-ethylhexyl sulfate (CAS No. 126-92-1; available from Niacet Corporation) or sodium n-octyl sulfate (commercially available as Texapon 842 Up from BASF). In embodiments, the anionic surfactant is or about 100; 90; 80; 70; 60; 50; 40; 30; 20; or 10 wt. % of the surfactant system.

Suitable amphoteric surfactants include alkylether hydroxypropyl sultaine (CAS Nos. 108797-84-8, 108797-85-9; commercially available as Mirataine ASC), disodium caprylampho dipropionate (CAS No. 68815-55-4), and amphoteric surfactant blends, particularly, low-foaming blends, such as Rhodaterge BCC commercially available from Rhodia. In embodiments, the amphoteric surfactant is or about 100; 90; 80; 70; 60; 50; 40; 30; 20; 10 wt. % of the surfactant system.

Suitable nonionic surfactants include an alcohol ethoxylate, such as Lutensol CS 6250 available from BASF. In embodiments, the nonionic surfactant comprises an alkyl chain of C6, C7, C8, or C9, or a mixture thereof. For example, the nonionic surfactant may comprise a mixture of C6, C7, C8 and C9 nonionic surfactants. As another example, the nonionic surfactant may comprise a mixture of any three nonionic surfactants of C6-C9, such as C6, C7 and C8; C6, C8 and C9; or C7, C8 and C9. As yet another example, the nonioinic surfactant may comprise a mixture of any two nonionic surfactants, such as C6 and C7; C6 and C8; C6 and C9; C7 and C8; C7 and C9; or C8 and C9. In other embodiments, the surfactant system does not include nonionic surfactants with an alkyl chain less than C6 and/or an alkyl chain greater than C9. In embodiments, the nonionic surfactant is or about 100; 90; 80; 70; 60; 50; 40; 30; 20; 10 wt. % of the surfactant system.

The present composition optionally comprises a wetting agent. In embodiments, the wetting agent is not a surfactant. The wetting agent may comprise 0.01 to about 5; 0.01 to 5; 0.01 to about 3; 0.01 to 3; 0.1 to about 5; 0.1 to 5; 0.1 to about 5; 0.1 to 3; 0.1 to about 3; 0.01 to 1; 0.01 to about 1; 1 to about 5; 1 to 5; 0.3 to about 3; 0.3 to 3; 0.5 to about 5; 0.5 to 5; 0.01 to about 0.5; about 0.2; about 0.3; about 0.4; about 0.5; about 0.6; 0.01 to 0.5 wt. % of the total composition. In preferred embodiments the wetting agent is an alkyl pyrrolidone, such as N-octyl-2-pyrrolidone (CAS No. 2687-94-7).

The present composition optionally comprises a chelant. The chelant may comprise 0.01 to about 20; 0.01 to 20; 0.01 to about 10; 0.01 to 10; 0.01 to about 4; 0.01 to 4; about 0.01 to about 1; about 0.2; about 0.3; about 0.4; about 0.5; about 0.6; 0.01 to about 1; or 0.01 to 1 wt % of the total composition. The chelant may be biodegradable. Suitable biodegradable chelants include ethylene diamine N, N'-disuccinic acids, especially the (S,S) isomer. Ethylene N,N'-disuccinnic acids are commercially available under the tradename (S,S) EDDS. Another suitable chelating agent is L-glutamic acid N,N-diacetic acid (GLDA) commercially available under tradename Dissolvine 47S. Additional amino carboxylates suitable for use in the composition of the present disclosure include ethylene diamine tetra acetates, diethylene triamine pentaacetates, diethylene triamine pentaacetate (DTPA), N-hydroxyethylethylenediamine triacetates, nitrilotriacetates, ethylenediamine tetrapropionates, triethylenetetraaminehexa-acetates, ethanoldiglycines, and methylglycine diacetic acid (MGDA), ethylenediaminetetraacetic acid dipotassium salt (EDTA), glucaric acid; or a salt thereof, or a mixture thereof. A trisodium salt of methylglycine diacetic acid and a sodium salt of glucaric acid are preferred. Additional chelating agents suitable for use include phosphonates, such as ethylene diamine tetra methylene phosphonates, diethylene triamine penta methylene phosphonates (DTPMP), 1-hydroxyethylidene-1,1-diphosphonic acid (HEDP), 1,5,9-triazacyclododecane-N,N',N"-tris(methylenephosphonic acid) (DOTRP), 1,4,7,10-tetraazacyclododecane-N,N',N",N"-tetrakis (methylenephosphonic acid) (DOTP), Nitrilotris (methylene)triphosphonic acid, diethylenetriaminepentakis (methylenephosphonic acid) (DETAP), amino tri (methylenephosphonic acid), bis(hexamethylene)triamine pentamethylene phosphonic acid, 1,4,7-triazacyclononane-N,N',N"-tris(methylenephosphonic acid (NOTP), hydroxyethyldiphosphonate, nitrilotris(methylene)phosphonic acid, 2-phosphono-butane-1,2,3,4-tetracarboxylic, carboxy ethyl phosphonic acid, aminoethyl phosphonic acid, glyphosate, and ethylene diamine tetra(methylenephosphonic acid)phenylphosphonic acid, as well as salts and/or derivatives thereof. In embodiments, the chelant may be a metal salt of the following carboxylic acids: oxalic acid, succinnic acid, aspartic acid, glutamic acid, glycine, malonic acid, glucaric acid, maleic acid, malic acid, malonic acid, adipic acid, phthalic acid, citric acid, sodium citrate, potassium citrate, ammonium citrate, tricarballylic acid, trimethylolpropionic acid, picolinic acid, dipicolinic acid, salicylic acid sulfosalicylic acid, sulfophthalic acid, sulphosuccinic acid, Betaine, gluconic acid, tartaric acid, glucuronic acid, and 2-carboxypyridine. In other embodiments, the chelant may be a sulfonic acid, such as TIRON (4,5-Dihydroxy-1,3-benzenedisulfonic acid disodium salt) or HEPES-2-[4-(2-hydroxyethyl) piperazin-1-yl) ethanesulfonic acid, sodium thioglycolate. In certain embodiments, the chelating agent is a nitrilotris(methylene)triphosphonic acid or an iminodiacetic acid.

The composition of the present disclosure may further comprise a thickener. In embodiments, the composition comprises in any effective amount of a thickener in order to increase the viscosity of the composition. The thickener may comprise 0.01 to about 20; 0.01 to 20; 0.01 to about 10; 0.01 to 10; 0.01 to about 4; 0.01 to 4; about 0.01 to about 1; 0.01 to about 1; about 0.2; about 0.3; about 0.4; about 0.5; about 0.6; or 0.01 to 1 wt % of the total composition.

Exemplary thickeners include a cellulose or a derivative thereof, alkyl cellulose, alkoxycellulose, hydroxyalkyl cellulose, hydroxyalkyl alkyl cellulose, carboxy alkyl cellulose, alkyl carboxy alkyl cellulose, natural polysaccharide polymer (such as xanthan gum, guar gum, Garrofin gum, tragacanth gum, or its derivatives), Microfibrillated Cellulose (MFC), polymers of polycarboxylate, polyacrylamides, and clays. The composition may comprise a mixture of the foregoing thickeners.

Exemplary cellulose derivatives include methyl cellulose, ethyl cellulose, hydroxymethyl cellulose, hydroxyethyl cellulose, hydroxypropyl cellulose, carboxymethyl cellulose, carboxymethylhydroxyethylcellulose, hydroxypropylcellulose, hydroxypropylmethylcellulose, ethylhydroxymethylcellulose and ethylhydrosiethylcellulose.

Exemplary polymers of polycarboxylate have a molecular weight of approximately 500,000 to about 4,000,000, preferably about 1,000,000 to about 4,000,000, preferably crosslinking from about 0.5% to about 4%. Preferred polymers of polycarboxylate include polyacrylate polymers, including those sold under the Carbopol®, Acrysol® brands ICS-1 and Sokalan®. Preferred polymers are polyacrylates; however, other monomers besides acrylic acid can be used to form polymeric thickeners that may be used in the present composition, including monomers, such as ethylene and propylene and anhydride maleic.

Exemplary clay thickeners include colloid-forming clays, such as, for example, Smectite and attapulgite types of clay thickeners. These clay materials can be described as layered clays expandable, which may be aluminosilicates and magnesium silicates. The term "expandable," as used to describe clay thickeners herein refers to the capacity of the layered structure of the clay to swell, or expand, on contact with water. Exemplary expandable clays are materials classified geologically as smectites (or montmorillonite) and attapulgitas (or paligorskitas).

In embodiments, the thickener is a surfactant outside of the surfactant system, such as a betaine (e.g., Tallow Dihydroxyethyl Betaine or Cocoamidopropyl Betaine).

Preferred thickeners are those that provide a useful benefit of increased viscosity for the desired pH of the compositions, particularly thickeners that are useful at pH of approximately 3 or less. The compositions comprising a thickener have a viscosity range from about 10 cps fluid solution to 20,000 cps gel consistency at ambient temperature. Particularly suitable Microfibrillated Cellulose thickeners are Exilva F 01-L, Exilva F 01-V from Borregaard. Other suitable thickeners are Van Gel SX (mixture of Xanthan Gum and Magnesium Aluminum Silicate, and Veegum R (Magnesium Aluminum Silicate) from Vanderbilt Minerals.

The composition of the present disclosure comprises at least one solvent other than water. Suitable solvents include one or more glycol ether solvents. Suitable glycol ether solvents include ethyleneglycol n-butyl ether, diethyleneglycol n-butyl ether, triethyleneglycol n-butyl ether, propyleneglycol n-butyl ether, dipropyleneglycol n-butyl ether, tripropyleneglycol n-butyl ether, ethyleneglycol n-pentyl ether, diethyleneglycol n-pentyl ether, triethyleneglycol n-pentyl ether, propyleneglycol n-pentyl ether, dipropyleneglycol n-pentyl ether, tripropyleneglycol n-pentyl ether, ethyleneglycol n-hexyl ether, diethyleneglycol n-hexyl ether, triethyleneglycol n-hexyl ether, propyleneglycol n-hexyl ether, dipropyleneglycol n-hexyl ether, tripropyleneglycol n-hexyl ether, ethyleneglycol phenyl ether, diethyleneglycol phenyl ether, triethyleneglycol phenyl ether, propyleneglycol phenyl ether, dipropyleneglycol phenyl ether, tripropyleneglycol phenyl ether, ethyleneglycol benzyl ether, diethyleneglycol benzyl ether, triethyleneglycol benzyl ether, propyleneglycol benzyl ether, dipropyleneglycol benzyl ether, tripropyleneglycol benzyl ether, ethyleneglycol isobutyl ether, diethyleneglycol isobutyl ether, triethyleneglycol isobutyl ether, propyleneglycol isobutyl ether, dipropyleneglycol isobutyl ether, tripropyleneglycol isobutyl ether, ethyleneglycol isopentyl ether, diethyleneglycol isopentyl ether, triethyleneglycol isopentyl ether, propyleneglycol isopentyl ether, dipropyleneglycol isopentyl ether, tripropyleneglycol isopentyl ether, ethyleneglycol isohexyl ether, diethyleneglycol isohexyl ether, triethyleneglycol isohexyl ether, propyleneglycol isohexyl ether, dipropyleneglycol isohexyl ether, tripropyleneglycol isohexyl ether, ethyleneglycol n-butyl methyl ether, diethyleneglycol n-butyl methyl ether triethyleneglycol n-butyl methyl ether, propyleneglycol n-butyl methyl ether, dipropyleneglycol n-butyl methyl ether, tripropyleneglycol n-butyl methyl ether, ethyleneglycol n-pentyl methyl ether, diethyleneglycol n-pentyl methyl ether, triethyleneglycol n-pentyl methyl ether, propyleneglycol n-pentyl methyl ether, dipropyleneglycol n-pentyl methyl ether, tripropyleneglycol n-pentyl methyl ether, ethyleneglycol n-hexyl methyl ether, diethyleneglycol n-hexyl methyl ether, triethyleneglycol n-hexyl methyl ether, propyleneglycol n-hexyl methyl ether, dipropyleneglycol n-hexyl methyl ether, tripropyleneglycol n-hexyl methyl ether, ethyleneglycol phenyl methyl ether, diethyleneglycol phenyl methyl ether, triethyleneglycol phenyl methyl ether, propyleneglycol phenyl methyl ether, dipropyleneglycol phenyl methyl ether, tripropyleneglycol phenyl methyl ether, ethyleneglycol benzyl methyl ether, diethyleneglycol benzyl methyl ether, triethyleneglycol benzyl methyl ether, propyleneglycol benzyl methyl ether, dipropyleneglycol benzyl methyl ether, tripropyleneglycol benzyl methyl ether, ethyleneglycol isobutyl methyl ether, diethyleneglycol isobutyl methyl ether, triethyleneglycol isobutyl methyl ether, propyleneglycol isobutyl methyl ether, dipropyleneglycol isobutyl methyl ether, tripropyleneglycol isobutyl methyl ether, ethyleneglycol isopentyl methyl ether, diethyleneglycol isopentyl methyl ether, triethyleneglycol isopentyl methyl ether, propyleneglycol isopentyl methyl ether, dipropyleneglycol isopentyl methyl ether, tripropyleneglycol isopentyl methyl ether, ethyleneglycol isohexyl methyl ether, diethyleneglycol isohexyl methyl ether, triethyleneglycol isohexyl methyl ether, propyleneglycol isohexyl methyl ether, dipropyleneglycol isohexyl methyl ether, tripropyleneglycol isohexyl methyl ether, and mixtures thereof.

In preferred embodiments, the at least one solvent other than water comprises a mixture of tripropylene glycol monobutyl ether (CAS No. 55934-93-5), polypropylene glycol monobutyl ether (CAS No. 9003-13-8), tripropylene glycol (CAS No. 24800-44-0), and dipropylene glycol n-butylether (CAS No. 29911-28-2). In further preferred embodiments, the following weight percentages relative to the total weight of the solvent component can be used: tripropylene glycol monobutyl ether (equal to or greater than 95%), polypropylene glycol monobutyl ether (equal to or less than 4%), tripropylene glycol (equal to or less than 1.9%), dipropylene glycol n-butylether (equal to or less than 1.5%).

In embodiments, the at least one solvent other than water comprises 0.05 to 20; 0.1 to 10; 0.1 to about 10; 0.2 to 5; 0.2 to about 5; 0.1 to about 8; 0.1 to about 5; 0.1 to 5; 0.1 to about 3; 0.1 to 3; 0.1 to about 2; 0.1 to 2; 0.1 to about 1; 0.1 to 1; about 0.1 to about 0.7; 0.1 to about 0.7; 0.1 to 0.7; 0.3 to 0.7; 0.01 to 0.5; 0.02 to 0.5; 0.02 to 0.25; 0.02 to 0.2; 0.05 to 0.25; 0.05 to 0.2; about 0.1; or about 0.5% wt. of the total composition.

The composition of the present disclosure may contain one or more auxiliary agents. An auxiliary agent may be a dye, fragrance, colorant, thickener or any other customary additive in cleaning formulations. Particularly suitable dyes include Liquitint Blue MC, Liquitint Bright Yellow, Experimental Orange 5GL1127, Experimental Red 5GL1127, and Experimental Yellow 5GL585, all available from Milliken & Company. MethaneSulfonic Acid is available from BASF under tradenames Lutropur MSA 70, Lutropur MSA 100 & Lutropur MSA XP and Arkema tradenames Scaleva MSA and Scaleva MSA LC.

Exemplary embodiments of the composition of the present disclosure can be found in Tables 1-10.

TABLE 1

| Component | Weight Percentage |
|---|---|
| Water | 5-99 |
| Alkyl Sulfonic Acid | 0.1-95 |
| Organic Acid | 0-40 |
| Surfactant System | 0.001-20 |
| Chelant | 0-20 |
| Non-Water Solvent | 0.05-20 |

TABLE 2

| Component | Weight Percentage |
|---|---|
| Water | 56.13 |
| Alkyl Sulfonic Acid | 42.0 |
| Organic Acid | 1.0 |
| Surfactant System | 0.17 |
| Chelant | 0.20 |
| Non-Water Solvent | 0.50 |

TABLE 3

| Component | Weight Percentage |
|---|---|
| Water | 56.13 |
| Methanesulfonic Acid | 42.0 |
| Sulfamic Acid | 1.0 |
| C6-C9 Surfactant System | 0.17 |
| Methylglycine diacetic acid | 0.20 |
| Glycol Ether Solvent | 0.50 |

TABLE 4

| Component | Weight Percentage |
|---|---|
| Water | 57.13 |
| Methanesulfonic Acid | 42.0 |
| C6-C9 Surfactant System | 0.17 |
| Methylglycine diacetic acid | 0.20 |
| Glycol Ether Solvent | 0.50 |

TABLE 5

| Component | Weight Percentage |
|---|---|
| Water | 71.20 |
| Methanesulfonic Acid | 28.0 |
| C6 Surfactant System | 0.10 |
| Methylglycine diacetic acid | 0.21 |
| Glycol Ether Solvent | 0.49 |

TABLE 6

| Component | Weight Percentage |
|---|---|
| Water | 70.92 |
| Methanesulfonic Acid | 28.0 |
| C6 Surfactant System | 0.10 |
| TIRON (4,5-Dihydroxy-1,3-benzenedisulfonic acid disodium salt) | 0.50 |
| Glycol Ether Solvent | 0.48 |

TABLE 7

| Component | Weight Percentage |
|---|---|
| Water | 86.18 |
| Methanesulfonic Acid | 10.50 |
| Sulfamic Acid | 2.00 |
| C6 Surfactant System | 0.04 |
| Methylglycine diacetic acid | 0.80 |
| Glycol Ether Solvent | 0.48 |

TABLE 8

| Component | Weight Percentage |
|---|---|
| Water | 81.33 |
| Methanesulfonic Acid | 2.20 |
| Lactic Acid | 13.21 |
| Sulfamic Acid | 2.00 |
| C6 Surfactant System | 0.06 |
| Methylglycine diacetic acid | 0.20 |
| Glycol Ether Solvent | 1.00 |

TABLE 9

| Component | Weight Percentage |
|---|---|
| Water | 41.53 |
| Methanesulfonic Acid | 56.0 |
| C6 Surfactant System | 0.40 |
| Methylglycine diacetic acid | 1.00 |
| N-Octyl-2-Pyrrolidone | 0.10 |
| Glycol Ether Solvent | 0.97 |

TABLE 10

| Component | Weight Percentage |
|---|---|
| Water | 86.25 |
| Methanesulfonic Acid | 10.50 |
| Sulfamic Acid | 2.00 |
| C6 Surfactant System | 0.04 |
| Methylglycine diacetic acid | 0.32 |
| Glycol Ether Solvent | 0.49 |
| Microfibrillated Cellulose (MFC) | 0.40 |

The composition described in the present disclosure can be manufactured by multiple means using techniques known to those skilled in the art. The following method is not intended to be limiting, but illustrative of a method to obtain the composition of the present disclosure.

Distilled water is added into a stainless steel vessel followed by the components of the surfactant system, chelant (if present), organic acid (if present), solvent and stirred until the mixture is uniformly mixed. The balance of the acidic component (i.e., one or more alkyl sulfonic acids) is then added slowly with proper mixing. The solution temperature may increase slightly upon addition of the balance of the acidic component.

Manufacturing of compositions of the present disclosure comprising a thickener requires making two separate batches and mixing. A first batch is made by mixing distilled water and thickener and applying appropriate agitation to insure complete dispersion. A second batch comprises distilled water and the balance of ingredients. First and second batches are then combined and mixed thoroughly.

As will be appreciated by those skilled in the art, obtaining a concentrated form of the composition of the present disclosure can be accomplished by varying the water content.

The present composition may be used for various cleaning applications that customarily use acidic formulations. The composition is especially suited for cleaning of industrial machines such as heat exchangers, cooling towers, evaporators, dishwashing machines, ice making machines where descaling speed and efficacy are needed. The present inventor has found that the present composition is particularly effective as a descaler. In embodiments, the present composition removes greater than 30% of scale from hard surfaces; greater than 35% of scale from hard surfaces; greater than 40% of scale from hard surfaces; and even 100% of scale from hard surfaces. The composition is also effective in the removal of other soils such as rust, and struvite. Generally, a method of cleaning an industrial machine with the present composition comprises: determining the appropriate dilution to use based on the level of scale to be removed and applying directly or by circulating the composition of the present disclosure throughout the machine, allowing the compositions to circulate from 1 to 3 hours, and rinsing the hard surface to remove the present composition and soil/scale. A method of cleaning a hard surface with a ready-to-use (RTU) of the present composition comprises: applying the composition of the present disclosure to a soiled hard surface, optionally waiting 15 seconds to 2 minutes, and optionally scrubbing the surface with a brush or the like, and wiping or rinsing the hard surface to remove the present composition and soil/scale.

While specific embodiments have been described in detail, it will be appreciated by those skilled in the art that various modifications and alternatives to those details could be developed in light of the overall teachings of the disclosure. Accordingly, the disclosure herein is meant to be illustrative only and not limiting as to its scope and should be given the full breadth of the appended claims and any equivalents thereof.

EXAMPLES

The following examples describe some of the technical effects of the composition of the present disclosure.

Example 1. In this Example, the descaling performance of a composition comprising a glycol solvent was assessed against compositions where water was the only solvent. The descaling removal performance was assessed by soaking a Carrara marble block (consisting essentially of calcium carbonate) into 20 grams of an aqueous composition for fifteen (15) minutes. The rectangular blocks were approximately 5.6 grams. After 15 minutes of exposure, the marble blocks were immersed in distilled water to rinse away the aqueous composition. The blocks were then dried in an oven at 50° C. for three (3) hours and weighed. Performance was determined based on the weight percentage of the marble block dissolved.

Table 11 shows descaling data for compositions comprising different surfactants. Each composition tested comprised methanesulfonic acid (42 wt. % of total composition), a chelant (Trilon M) (0.2 wt. % of total composition), an organic acid (sulfamic acid at 1.0 wt. %) and a surfactant system. The inventive composition of Table 2 & 3 was tested with a surfactant system comprising C6 non-ionic surfactant and C8-10 non-ionic surfactants in combination with glycol ether solvent. The comparator compositions were identical except the surfactant system lacked glycol ether solvent. Inventive compositions comprising glycol ether solvent had 16-85% increased descaling benefit.

TABLE 11

| | | Start Wt. | End Wt. | Delta | % change | Avg. % | Std. Dev. |
|---|---|---|---|---|---|---|---|
| C6 Alcohol | Inventive 1 | 5.7519 | 3.0062 | 2.7457 | 47.74 | 48.49 | 0.66 |
| Ethoxylate + | Inventive 1 | 5.6657 | 2.8905 | 2.7752 | 48.98 | | |
| Glycol Ether | Inventive 1 | 5.6423 | 2.8923 | 2.7500 | 48.74 | | |
| C6 | Comp. 1 | 5.6676 | 3.3955 | 2.2721 | 40.09 | 41.70 | 1.39 |
| Alcohol | Comp. 1 | 5.6429 | 3.2486 | 2.3943 | 42.43 | | |
| Ethoxylate | Comp. 1 | 5.6222 | 3.2289 | 2.3933 | 42.57 | | |
| C810 Alcohol | Inventive 2 | 5.5474 | 3.9267 | 1.6207 | 29.22 | 29.49 | 0.42 |
| Ethoxylate + | Inventive 2 | 5.5945 | 3.9176 | 1.6769 | 29.97 | | |
| Glycol Ether | Inventive 2 | 5.5345 | 3.9135 | 1.6210 | 29.29 | | |
| C810 | Comp. 2 | 5.6866 | 4.7452 | 0.9414 | 16.55 | 15.90 | 0.42 |
| Alcohol | Comp. 2 | 5.6669 | 4.7959 | 0.8710 | 15.37 | | |
| Ethoxylate | Comp. 2 | 5.5360 | 4.6628 | 0.8732 | 15.77 | | |

The foregoing demonstrates that the present inventor surprisingly found that the addition of the glycol solvent increased performance across all of the surfactant systems tested, and in some cases to a significant degree. As would be understood by one skilled in the art, the present inventor discovered that addition of a glycol solvent increased descaling efficacy in an embodiment that had the highest descaling efficacy where a C6 nonioinic surfactant system was used and efficacy decreased as the alkyl chain was lengthened.

Example 2. Table 12 shows descaling data for compositions comprising different surfactants. Each composition tested comprised methanesulfonic acid (42 wt. % of total composition), a chelant (Trilon M) (0.2 wt. % of total composition), and a surfactant system. The inventive composition of Table 4 was tested with a surfactant system comprising C6 non-ionic surfactant, C8 Alkyl Sulfate, C810 Alkyl Ethoxylate, C1012 Alkyl Ethoxylate, and C12 Amine Oxide surfactants in combination with glycol ether solvent. The comparator compositions were identical except the surfactant system lacked glycol ether solvent. Inventive compositions comprising glycol ether solvent had 31-85% increased descaling benefit.

TABLE 12

| | | Start Wt. | End Wt. | Delta | % change | Avg. % | Std. Dev. |
|---|---|---|---|---|---|---|---|
| C6 Alkyl | Inventive 2 | 5.6916 | 2.8847 | 2.8069 | 49.32 | 49.20 | 0.17 |
| Ethoxylate + | Inventive 2 | 5.6785 | 2.8796 | 2.7989 | 49.29 | | |
| Glycol Ether | Inventive 2 | 5.7212 | 2.9174 | 2.8038 | 49.01 | | |
| C6 | Comp. 2 | 5.6393 | 3.5018 | 2.1375 | 37.90 | 37.53 | 0.59 |
| Alkyl | Comp. 2 | 5.5235 | 3.4881 | 2.0354 | 36.85 | | |
| Ethoxylate | Comp. 2 | 5.5290 | 3.4363 | 2.0927 | 37.85 | | |
| C8 Alkyl | Inventive 2 | 5.6491 | 3.1224 | 2.5267 | 44.73 | 44.6 | 0.41 |
| Sulfate Anionic + | Inventive 2 | 5.6757 | 3.1286 | 2.5471 | 44.88 | | |
| Glycol Ether | Inventive 2 | 5.5331 | 3.0926 | 2.4405 | 44.11 | | |
| C8 Alkyl | Comp. 2 | 5.6069 | 3.7987 | 1.8082 | 32.25 | 33.2 | 0.79 |
| Sulfate | Comp. 2 | 5.6480 | 3.7534 | 1.8946 | 33.54 | | |
| Anionic | Comp. 2 | 5.6480 | 3.7461 | 1.9019 | 33.67 | | |
| C8 N-Octyl- | Inventive 3 | 5.5627 | 2.9744 | 2.5883 | 46.53 | 45.32 | 1.05 |
| 2-Pyrrolidone + | Inventive 3 | 5.5867 | 3.0928 | 2.4939 | 44.64 | | |
| Glycol Ether | Inventive 3 | 5.7013 | 3.1475 | 2.5538 | 44.79 | | |
| C8 N-Octyl- | Comp. 3 | 5.6756 | 3.9015 | 1.7741 | 31.26 | 31.53 | 0.28 |
| 2- | Comp. 3 | 5.6489 | 3.8521 | 1.7968 | 31.81 | | |
| Pyrrolidone | Comp. 3 | 5.6815 | 3.8911 | 1.7904 | 31.51 | | |
| C810 Alcohol | Inventive 3 | 5.5474 | 3.9267 | 1.6207 | 29.22 | 29.49 | 0.42 |
| Ethoxylate + | Inventive 3 | 5.5945 | 3.9176 | 1.6769 | 29.97 | | |
| Glycol Ether | Inventive 3 | 5.5345 | 3.9135 | 1.6210 | 29.29 | | |
| C810 | Comp. 3 | 5.6866 | 4.7452 | 0.9414 | 16.55 | 15.9 | 0.60 |
| Alcohol | Comp. 3 | 5.6669 | 4.7959 | 0.8710 | 15.37 | | |
| Ethoxylate | Comp. 3 | 5.5360 | 4.6628 | 0.8732 | 15.77 | | |
| C1012 Alcohol | Inventive 5 | 5.5847 | 4.3074 | 1.2773 | 22.87 | 23.3 | 0.61 |
| Ethoxylate + | Inventive 5 | 5.6999 | 4.3895 | 1.3104 | 22.99 | | |
| Glycol Solvent | Inventive 5 | 5.6458 | 4.2915 | 1.3543 | 23.99 | | |
| C1012 | Comp. 5 | 5.5925 | 4.8373 | 0.7552 | 13.50 | 13.8 | 0.30 |
| Alcohol | Comp. 5 | 5.6983 | 4.8957 | 0.8026 | 14.08 | | |
| Ethoxylate | Comp. 5 | 5.6489 | 4.8612 | 0.7877 | 13.94 | | |
| C12 Amine | Inventive 4 | 5.5391 | 4.3581 | 1.1810 | 21.32 | 21.9 | 0.92 |
| Oxide + | Inventive 4 | 5.4773 | 4.3005 | 1.1768 | 21.49 | | |
| Glycol Solvent | Inventive 4 | 5.6209 | 4.3287 | 1.2922 | 22.99 | | |
| C12 | Comp. 4 | 5.6476 | 4.9777 | 0.6699 | 11.86 | 12.10 | 0.29 |
| Amine | Comp. 4 | 5.7374 | 5.0245 | 0.7129 | 12.43 | | |
| Oxide | Comp. 4 | 5.5629 | 4.8948 | 0.6681 | 12.01 | | |

Example 3. In this example, the effect of the presence of solvent in the present composition was investigated. The composition comprising 28% MSA of Table 5 was tested with and without a glycol ether solvent. Water was substituted for the glycol ether solvent in the Comparator Composition. As shown in Table 13, the descaling benefit for the composition comprising glycol solvent is 29% higher than the composition without a glycol ether solvent.

TABLE 13

| | | Start Wt. | End Wt. | Delta | % change | Avg. % | Std. Dev. |
|---|---|---|---|---|---|---|---|
| C6 Alcohol | Inventive 1 | 5.5272 | 3.1833 | 2.3439 | 42.41 | 42.7 | 0.32 |
| Ethoxylate + | Inventive 1 | 5.5580 | 3.1869 | 2.3711 | 42.66 | | |
| Glycol Ether | Inventive 1 | 5.4616 | 3.1104 | 2.3512 | 43.05 | | |
| C6 Alcohol | Comp. 1 | 5.4881 | 3.6862 | 1.8019 | 32.83 | 33.10 | 0.49 |
| Ethoxylate | Comp. 1 | 5.3261 | 3.5329 | 1.7932 | 33.67 | | |
| | Comp. 1 | 5.6089 | 3.7696 | 1.8393 | 32.79 | | |

Example 4. In this example, the effect of the presence of solvent in the present composition was investigated. The composition comprising 28% MSA and 0.5% Tiron chelant of Table 6 was tested with and without a glycol ether solvent. Water was substituted for the glycol ether solvent in the Comparator Composition. As shown in Table 14, the descaling benefit for the inventive composition comprising glycol solvent is 27% higher than the composition without glycol ether solvent.

TABLE 14

| | | Start Wt. | End Wt. | Delta | % change | Avg. % | Std. Dev. |
|---|---|---|---|---|---|---|---|
| C6 Alcohol | Inventive 1 | 5.7044 | 3.3477 | 2.3567 | 41.31 | 42.0 | 0.62 |
| Ethoxylate + | Inventive 1 | 5.6311 | 3.2498 | 2.3813 | 42.29 | | |
| Glycol Ether | Inventive 1 | 5.6133 | 3.2300 | 2.3833 | 42.46 | | |
| C6 Alcohol | Comp. 1 | 5.6493 | 3.7947 | 1.8546 | 32.83 | 33.10 | 0.59 |
| Ethoxylate | Comp. 1 | 5.4480 | 3.6060 | 1.8420 | 33.81 | | |
| | Comp. 1 | 5.5979 | 3.7644 | 1.8335 | 32.75 | | |

Example 4. In this example, the effect of the presence of solvent in the present composition was investigated. The composition comprising 10.5% MSA of Table 7 was tested with and without a glycol ether solvent. Water was substituted for the glycol ether solvent in the Comparator Composition. As shown in Table 15, the descaling benefit for the inventive composition comprising glycol solvent is 7.1% higher than the composition without glycol ether solvent.

TABLE 15

| | | Start Wt. | End Wt. | Delta | % change | Avg. % | Std. Dev. |
|---|---|---|---|---|---|---|---|
| C6 Alcohol | Inventive 1 | 5.6160 | 4.6367 | 0.9793 | 17.44 | 17.65 | 0.28 |
| Ethoxylate + | Inventive 1 | 5.6974 | 4.6980 | 0.9994 | 17.54 | | |
| Glycol Ether | Inventive 1 | 5.5680 | 4.5677 | 1.0003 | 17.97 | | |
| C6 Alcohol | Comp. 1 | 5.4554 | 4.5562 | 0.8992 | 16.48 | 16.06 | 0.37 |
| Ethoxylate | Comp. 1 | 5.6226 | 4.7290 | 0.8936 | 15.89 | | |
| | Comp. 1 | 5.5767 | 4.6959 | 0.8808 | 15.79 | | |

Example 5. The performance of a composition comprising 2.20% MSA, 13.22% Lactic Acid, and 2% Sulfamic Acid from Table 8 are shown in Table 16. For the inventive composition comprising glycol solvent the measured descaling power was 19.3% higher than the comparator product lacking glycol ether.

TABLE 16

| | | Start Wt. | End Wt. | Delta | % change | Avg. % | Std. Dev. |
|---|---|---|---|---|---|---|---|
| C6 | Inventive 1 | 5.6769 | 5.2329 | 0.4440 | 7.82 | 8.27 | 0.68 |
| Amphoteric + | Inventive 1 | 5.6319 | 5.1847 | 0.4472 | 7.94 | | |
| Glycol Ether | Inventive 1 | 5.3928 | 4.9050 | 0.4878 | 9.05 | | |
| C6 | Comp. 1 | 5.5518 | 5.1685 | 0.3833 | 6.90 | 6.93 | 0.19 |
| Amphoteric | Comp. 1 | 5.7399 | 5.3521 | 0.3878 | 6.76 | | |
| | Comp. 1 | 5.6273 | 5.2264 | 0.4009 | 7.12 | | |

Example 6. The performance of an undiluted concentrate comprising 56% MSA from Table 9 in neat and diluted forms is shown in Table 17. To form the inventive diluted composition, the concentrate was diluted 1:1 with distilled water to give a final MSA concentration of 28% and the measured descaling power was 36.8%.

TABLE 17

| | | Start Wt. | End Wt. | Delta | % change | Avg. % | Std. Dev. |
|---|---|---|---|---|---|---|---|
| C6 Alcohol | Inventive 1 | 5.5994 | 3.5119 | 2.0875 | 37.28 | 36.8 | 0.49 |
| Ethoxylate + | Inventive 1 | 5.5970 | 3.5457 | 2.0513 | 36.65 | | |
| Glycol Ether | Inventive 1 | 5.7210 | 3.6435 | 2.0775 | 36.31 | | |
| C6 Alcohol | Comp. 1 | 5.6633 | 5.6631 | 0.0002 | 0.0035 | 0.00 | 0.00 |
| Ethoxylate + | Comp. 1 | 5.5432 | 5.5431 | 0.0001 | 0.0018 | | |
| Glycol Ether | Comp. 1 | 5.3573 | 5.3568 | 0.0005 | 0.0093 | | |
| Neat Concentrate | | | | | | | |

Example 7. The performance of a composition shown on Table 10 comprising 10.5% MSA and microfibrillated cellulose thickener with viscosity of 89 cps is shown on Table 18, which demonstrates the use of a thickener does not materially impact the performance of the inventive composition. Viscosity of inventive compositions comprising a thickener was measured using a digital rotational viscometer. Measurements were carried out at ambient temperature using a number 2 spindle and velocity of 60 rpm.

TABLE 18

| | | Start Wt. | End Wt. | Delta | % change | Avg. % | Std. Dev. |
|---|---|---|---|---|---|---|---|
| C6 Alcohol | Inventive 1 | 5.6043 | 4.6743 | 0.9300 | 16.59 | 16.72 | 0.21 |
| Ethoxylate + | Inventive 1 | 5.6638 | 4.7029 | 0.9609 | 16.97 | | |
| Glycol Ether + Microfibrillated Cellulose | Inventive 1 | 5.5720 | 4.6471 | 0.9249 | 16.60 | | |
| C6 Alcohol | Comp. 1 | 5.4890 | 4.5530 | 0.9360 | 17.05 | 16.94 | 0.36 |
| Ethoxylate + | Comp. 1 | 5.5180 | 4.5670 | 0.9510 | 17.23 | | |
| Glycol Ether | Comp. 1 | 5.5490 | 4.6310 | 0.9180 | 16.54 | | |

EMBODIMENTS

The present disclosure notes that various embodiments are disclosed herein, including:

A. An acidic descaling composition comprising an acidic component, a non-water solvent and a surfactant system.

A1. The acidic descaling composition of embodiment A, wherein the composition is an aqueous liquid composition.

A2. The acidic descaling composition of any preceding embodiment, wherein the composition is capable of removing greater than 25%; greater than 30%; greater than 35%; greater than 40%; or greater than 45% of scale from hard surfaces.

A3. The acidic descaling composition of any preceding embodiment, wherein the composition has a pH of 0 to 6.

A3i. The acidic descaling composition of embodiment A3, wherein the composition has a pH of 0 to about 2.

A3ii. The acidic descaling composition of embodiment A3, wherein the composition has a pH of 0 to 2.

A3iii. The acidic descaling composition of embodiment A3, wherein the composition has a pH of 0 to about 1.

A3iv. The acidic descaling composition of embodiment A3, wherein the composition has a pH of 0 to 1.

A4. The acidic descaling composition of any preceding embodiment, wherein the weight percentage ratio of the acidic component relative to the surfactant system is greater than 2:1.

A4i. The acidic descaling composition of embodiment A4, wherein the weight percentage ratio of the acidic component relative to the surfactant system is greater than 4:1.

A4ii. The acidic descaling composition of embodiment A4, wherein the weight percentage ratio of the acidic component relative to the surfactant system is greater than 8:1.

A4ii. The acidic descaling composition of embodiment A4, wherein the weight percentage ratio of the acidic component relative to the surfactant system is greater than 15:1.

A4iv. The acidic descaling composition of embodiment A4, wherein the weight percentage ratio of the acidic component relative to the surfactant system is greater than 50:1.

A4v. The acidic descaling composition of embodiment A4, wherein the weight percentage ratio of the acidic component relative to the surfactant system is greater than 100:1.

A4vi. The acidic descaling composition of embodiment A4, wherein the weight percentage ratio of the acidic component relative to the surfactant system is greater than 150:1.

A4vii. The acidic descaling composition of embodiment A4, wherein the weight percentage ratio of the acidic component relative to the surfactant system is greater than 200:1.

A5. The acidic descaling composition of any preceding embodiment, wherein the weight percentage ratio of the alkyl sulfonic acid component relative to the organic acidic component is between 50:1 and 500:1.

A5i. The acidic descaling composition of embodiment A5, wherein the weight percentage ratio of the alkyl sulfonic acid component relative to the organic acidic component is between 100:1 and 400:1.

A5ii. The acidic descaling composition of embodiment A5, wherein the weight percentage ratio of the alkyl sulfonic acid component relative to the organic acidic component is between 200:1 and 300:1.

A5iii. The acidic descaling composition of embodiment A5, wherein the weight percentage ratio of the alkyl sulfonic acid component relative to the organic acidic component is about 250:1.

A6. The acidic descaling composition of any preceding embodiment, wherein the composition lacks a gelling agent.

A7. The acidic descaling composition of any preceding embodiment, wherein the composition lacks a foaming agent.

A8. The acidic descaling composition of any preceding embodiment, wherein the composition lacks any agent, not described herein, that would increase the residency time of the composition of the present disclosure when the composition is applied to a sloped or vertical surface.

B. The acidic descaling composition of any preceding embodiment, wherein the acidic component comprises one or more alkyl sulfonic acids.

B1. The acidic descaling composition of any preceding embodiment, wherein the one or more alkyl sulfonic acids is one or more short chain alkyl sulfonic acids.

B2. The acidic descaling composition of any preceding embodiment, wherein the one or more alkyl sulfonic acids comprises one or more C1-C6 alkyl sulfonic acid.

B3. The acidic descaling composition of any preceding embodiment, wherein the one or more alkyl sulfonic acids consists of one or more C1-C6 alkyl sulfonic acids.

B4. The acidic descaling composition of any preceding embodiment, wherein the one or more alkyl sulfonic acids is on C1-C6 alkyl sulfonic acid.

B5. The acidic descaling composition of any preceding embodiment, wherein the one or more alkyl sulfonic acids comprises methanesulfonic acid.

B6. The acidic descaling composition of any preceding embodiment, wherein the one or more alkyl sulfonic acids consists of methanesulfonic acid.

B7. The acidic descaling composition of any preceding embodiment, wherein the one or more alkyl sulfonic acids consists essentially of methanesulfonic acid.

B8. The acidic descaling composition of any preceding embodiment, wherein the one or more alkyl sulfonic acids comprises ethanesulfonic acid.

B9. The acidic descaling composition of any preceding embodiment, except for embodiments B6 and B7, wherein the acidic component further comprises an organic acid.

B9i. The acidic descaling composition of embodiment B9, wherein the organic acid is selected from the group consisting of alkyl sulfonic acids include formic acid, butyric acid, valeric acid, caproic acid, itaconic acid, oxalic acid, terephthalic acid, citric acid, glycolic acid, propionic acid, 3-hydroxypropionic acid, acetic acid, lactic acid, malonic acid, maleic acid, succinic acid, hydroxyl succinic acid, adipic acid, octanoic acid, 2-methyl octanoic acid, fumaric acid, itaconic acid, methacrylic acid, sulfamic acid, methylsulfamic acid, propionic acid, gluconic acid, glutamic acid, glutaric acid, glucaric acid, benzoic acid, tartaric acid, hydroxyacetic acid, and salicylic acid; or mixtures thereof.

B9ii. The acidic descaling composition of embodiment B9, wherein the organic acid is selected from the group consisting of lactic acid, citric acid, sulfamic acid, gluconic acid, glucaric acid, and 3-hydroxypropionic acid.

B10. The acidic descaling composition of any preceding embodiment, where in the acidic component lacks an inorganic acid.

B11. The acidic descaling composition of any preceding embodiment, wherein the acidic component lacks phosphoric acid.

B12. The acidic descaling composition of any preceding embodiment, wherein the acidic component comprises about 0.1 to about 45 wt. % of the total composition.

B12i. The acidic descaling composition of embodiment B12, wherein the acidic component comprises 10 to about 45 wt. % of the total composition.

B12ii. The acidic descaling composition of embodiment B12, wherein the acidic component comprises 15 to about 45 wt. % of the total composition.

B12iii. The acidic descaling composition of embodiment B12, wherein the acidic component comprises 30 to 45 wt. % of the total composition.

B12iv. The acidic descaling composition of embodiment B12, wherein the acidic component comprises 0.1 to 43 wt. % of the total composition.

B12v. The acidic descaling composition of embodiment B12, wherein the acidic component comprises 10 to about 43 wt. % of the total composition.

B12vi. The acidic descaling composition of embodiment B12, wherein the acidic component comprises 15 to about 43 wt. % of the total composition.

B12vii. The acidic descaling composition of embodiment B12, wherein the acidic component comprises 20 to about 43 wt. % of the total composition.

B12viii. The acidic descaling composition of embodiment B12, wherein the acidic component comprises 25 to 43 wt. % of the total composition.

B12ix. The acidic descaling composition of embodiment B12, wherein the acidic component comprises 0.1 to 30 wt. % of the total composition.

B12x. The acidic descaling composition of embodiment B12, wherein the acidic component comprises 5 to about 30 wt. % of the total composition.

B12xi. The acidic descaling composition of embodiment B12, wherein the acidic component comprises 10 to about 30 wt. % or 10 to 30 wt % of the total composition.

B12xii. The acidic descaling composition of embodiment B12, wherein the acidic component comprises 0.1 to 20 wt. % of the total composition.

B12xiii. The acidic descaling composition of embodiment B12, wherein the acidic component comprises 5 to about 20 wt. % of the total composition.

B12xiv. The acidic descaling composition of embodiment B12, wherein the acidic component comprises 0.1 to about 10 wt. % of the total composition.

B12xv. The acidic descaling composition of embodiment B12, wherein the acidic component comprises 0.1 to 10 wt. % of the total composition.

B12xvi. The acidic descaling composition of embodiment B12, wherein the acidic component comprises 0.1 to 45% wt. % of the total composition.

B12xvii. The acidic descaling composition of embodiment B12, wherein the acidic component comprises 25 to 35 wt. % of the total composition.

B12xviii. The acidic descaling composition of embodiment B12, wherein the acidic component comprises 25 to 45 wt. % of the total composition.

B12xix. The acidic descaling composition of embodiment B12, wherein the acidic component comprises 30 to 45 wt. % of the total composition.

B12xx. The acidic descaling composition of embodiment B12, wherein the acidic component comprises 35 to 45 wt. % of the total composition.

B12xxi. The acidic descaling composition of embodiment B12, wherein the acidic component comprises 20 to 45 wt. % of the total composition.

B12xxii. The acidic descaling composition of embodiment B12, wherein the acidic component comprises 25 to 43 wt. % of the total composition.

B13. The acidic descaling composition of any preceding embodiment, wherein the composition is dilutable, and wherein the acidic component comprises about 45 to about 95 wt. % of the total composition.

B13i. The acidic descaling composition of embodiment B13, wherein the acidic component comprises 45 to 95 wt. % of the total composition.

B13ii. The acidic descaling composition of embodiment B13, wherein the acidic component comprises 45 to about 80 wt. % of the total composition.

B13iii. The acidic descaling composition of embodiment B13, wherein the acidic component comprises 45 to 80 wt. % of the total composition.

B13iv. The acidic descaling composition of embodiment B13, wherein the acidic component comprises 45 to about 70 wt. % of the total composition.

B13v. The acidic descaling composition of embodiment B13, wherein the acidic component comprises 45 to 70 wt. % of the total composition.

B13vi. The acidic descaling composition of embodiment B13, wherein the acidic component comprises 45 to about 60 wt. % of the total composition.

B13vii. The acidic descaling composition of embodiment B13, wherein the acidic component comprises 45 to 60 wt. % of the total composition.

B13viii. The acidic descaling composition of embodiment B13, wherein the acidic component comprises 45 to about 50 wt. % of the total composition.

B13ix. The acidic descaling composition of embodiment B13, wherein the acidic component comprises 45 to 50 wt. % of the total composition.

B13x. The acidic descaling composition of embodiment B13, wherein the acidic component comprises 50 to about 95 wt. % of the total composition.

B13xi. The acidic descaling composition of embodiment B13, wherein the acidic component comprises 50 to 95 wt. % of the total composition.

B13xii. The acidic descaling composition of embodiment B13, wherein the acidic component comprises 55 to about 95 wt. % of the total composition.

B13xiii. The acidic descaling composition of embodiment B13, wherein the acidic component comprises 55 to 95 wt. % of the total composition.

B13xiv. The acidic descaling composition of embodiment B13, wherein the acidic component comprises 60 to about 95 wt. % of the total composition.

B13xv. The acidic descaling composition of embodiment B13, wherein the acidic component comprises 60 to 95 wt. % of the total composition.

B13xvi. The acidic descaling composition of embodiment B13, wherein the acidic component comprises 65 to about 95 wt. % of the total composition.

B13xvii. The acidic descaling composition of embodiment B13, wherein the acidic component comprises 65 to 95 wt. % of the total composition.

B13xviii. The acidic descaling composition of embodiment B13, wherein the acidic component comprises 70 to 95 wt. % of the total composition.

B13xix. The acidic descaling composition of embodiment B13, wherein the acidic component comprises 70 to about 95 wt. % of the total composition.

B13xx. The acidic descaling composition of embodiment B13, wherein the acidic component comprises 75 to about 95 wt. % of the total composition.

B13xxi. The acidic descaling composition of embodiment B13, wherein the acidic component comprises 75 to 95 wt. % of the total composition.

C. The acidic descaling composition of any preceding embodiment, wherein the surfactant system comprises one or more anionic surfactants, one or more nonionic surfactants, one or more amphoteric surfactants, or a combination thereof.

C1. The acidic descaling composition of embodiment C, wherein the surfactant system comprises a nonionic surfactant.

C1i. The acidic descaling composition of embodiment C1, the nonionic surfactant comprises an alkyl chain of C6, C7, C8, or C9, or a mixture thereof.

C1ii. The acidic descaling composition of embodiment C1, the nonionic surfactant comprises a C6 alkyl chain.

C1iii. The acidic descaling composition of embodiment C1, the nonionic surfactant comprises a C7 alkyl chain.

C1iv. The acidic descaling composition of embodiment C1, the nonionic surfactant comprises a C8 alkyl chain.

C1v. The acidic descaling composition of embodiment C1, the nonionic surfactant comprises a C9 alkyl chain.

C1vi. The acidic descaling composition of embodiment C1, the nonionic surfactant comprises two nonionic surfactants, preferably wherein one nonionic surfactant comprises a C6 alkyl chain and the other nonionic surfactant comprises a C8 alkyl chain.

C1vii. The acidic descaling composition of any embodiment C1 to C1vi, wherein the nonionic surfactant comprises an alcohol ethoxylate.

C1viii. The acidic descaling composition of embodiment any embodiment C1 to

C1vii, wherein the nonionic surfactant is or about 100; 90; 80; 70; 60; 50; 40; 30; 20; or 10 wt. % of the surfactant system.

C2. The acidic descaling composition of embodiment C, wherein the surfactant system comprises an anionic surfactant.

C2i. The acidic descaling composition of embodiment C2, wherein the anionic surfactant comprises an alkyl sulfate C2ii. The acidic descaling composition of embodiment C2, wherein the anionic surfactant comprises sodium-2-ethylhexyl sulfate.

C2iii. The acidic descaling composition of embodiment C2, wherein the anionic surfactant comprises sodium n-octyl sulfate.

C2iv. The acidic descaling composition of embodiment C2, C2i, C2ii, or C2iii, wherein the anionic surfactant is or about 100; 90; 80; 70; 60; 50; 40; 30; 20; or 10 wt. % of the surfactant system.

C3. The acidic descaling composition of embodiment C, wherein the surfactant system comprises an amphoteric surfactant.

C3i. The acidic descaling composition of embodiment C3, wherein the amphoteric surfactant comprises an alkylether hydroxypropyl sultaine.

C3ii. The acidic descaling composition of embodiment C3, wherein the amphoteric surfactant comprisesdisodium caprylampho dipropionate.

C3iii. The acidic descaling composition of embodiment C3, wherein the amphoteric surfactant comprises a blend of amphoteric surfactants.

C3iv. The acidic descaling composition of embodiment C3, C3i, C3ii or C3iii, wherein the amphoteric surfactant is or about 100; 90; 80; 70; 60; 50; 40; 30; 20; or 10 wt. % of the surfactant system.

C4. The acidic descaling composition of any preceding embodiment, wherein the surfactant system comprises a low-foaming surfactant.

C5. The acidic descaling composition of any preceding embodiment, wherein the surfactant system comprises 0.001 to about 10 wt. % of the total composition.

C5i. The acidic descaling composition of embodiment C5, wherein the surfactant system comprises about 0.01 or 0.01 to 10 wt. % of the total composition.

C5ii. The acidic descaling composition of embodiment C5, wherein the surfactant system comprises 0.01 to about 5 wt. % of the total composition.

C5iii The acidic descaling composition of embodiment C5, wherein the surfactant system comprises 0.01 to 5 wt. % of the total composition.

C5iv. The acidic descaling composition of embodiment C5, wherein the surfactant system comprises 0.01 to about 2.5 wt. % of the total composition.

C5v. The acidic descaling composition of embodiment C5, wherein the surfactant system comprises 0.01 to 2.5 wt. % of the total composition.

C5vi. The acidic descaling composition of embodiment C5, wherein the surfactant system comprises 0.01 to about 1.0 wt. % of the total composition.

C5vii. The acidic descaling composition of embodiment C5, wherein the surfactant system comprises 0.01 to 1.0 wt. % of the total composition.

C5viii. The acidic descaling composition of embodiment C5, wherein the surfactant system comprises about 0.01 to about 0.25 wt. % of the total composition.

C5ix. The acidic descaling composition of embodiment C5, wherein the surfactant system comprises 0.01 to about 0.25 wt. % of the total composition.

C5x. The acidic descaling composition of embodiment C5, wherein the surfactant system comprises 0.01 to 0.25 wt. % of the total composition.

C5xi. The acidic descaling composition of embodiment C5, wherein the surfactant system comprises 0.05 to 0.25 wt. % of the total composition.

C5xii. The acidic descaling composition of embodiment C5, wherein the surfactant system comprises 0.05 to 0.20 wt. % of the total composition.

C5xiv. The acidic descaling composition of embodiment C5, wherein the surfactant system comprises 0.05 to 0.15 wt. % of the total composition.

C5xv. The acidic descaling composition of embodiment C5, wherein the surfactant system comprises 0.075 to 0.125 wt. % of the total composition.

D. The acidic descaling composition of any preceding embodiment, wherein the composition further comprises a wetting agent.

D1. The acidic descaling composition of embodiment D, wherein the wetting agent comprises 0.01 to about 5 wt. % of the total composition.

D1i. The acidic descaling composition of embodiment D2, wherein the wetting agent comprises 0.01 to 5 wt. % of the total composition.

D1ii. The acidic descaling composition of embodiment D2, wherein the wetting agent comprises 0.01 to about 3 wt. % of the total composition.

D1iii. The acidic descaling composition of embodiment D2, wherein the wetting agent comprises 0.01 to 3 wt. % of the total composition.

D1iv. The acidic descaling composition of embodiment D2, wherein the wetting agent comprises 0.1 to about 5 wt. % of the total composition.

D1v. The acidic descaling composition of embodiment D2, wherein the wetting agent comprises 0.1 to 5 wt. % of the total composition.

D1vi. The acidic descaling composition of embodiment D2, wherein the wetting agent comprises 0.1 to about 5 wt. % of the total composition.

D1vii. The acidic descaling composition of embodiment D2, wherein the wetting agent comprises 0.1 to 3 wt. % of the total composition.

D1viii. The acidic descaling composition of embodiment D2, wherein the wetting agent comprises 0.1 to about 3 wt. % of the total composition.

D1ix. The acidic descaling composition of embodiment D2, wherein the wetting agent comprises 0.01 to 1 wt. % of the total composition.

D1x. The acidic descaling composition of embodiment D2, wherein the wetting agent comprises 0.01 to about 1 wt. % of the total composition.

D1xi. The acidic descaling composition of embodiment D2, wherein the wetting agent comprises 1 to about 5 wt. % of the total composition.

D1xii. The acidic descaling composition of embodiment D2, wherein the wetting agent comprises 1 to 5 wt. % of the total composition.

D1xiii. The acidic descaling composition of embodiment D2, wherein the wetting agent comprises 0.3 to about 3 wt. % of the total composition.

D1xix. The acidic descaling composition of embodiment D2, wherein the wetting agent comprises 0.3 to 3 wt. % of the total composition.

D1xx. The acidic descaling composition of embodiment D2, wherein the wetting agent comprises 0.5 to about 5 wt. % of the total composition.

D1xxi. The acidic descaling composition of embodiment D2, wherein the wetting agent comprises 0.5 to 5 wt. % of the total composition.

D1xxii. The acidic descaling composition of embodiment D2, wherein the wetting agent comprises 0.01 to about 0.5 wt. % of the total composition.

D1xxiii. The acidic descaling composition of embodiment D2, wherein the wetting agent comprises 0.01 to 0.5 wt. % of the total composition.

D2. The acidic descaling composition of any embodiment D to D1xxiii, wherein the wetting agent comprises an alkyl pyrrolidone.

D2i. The acidic descaling composition of embodiment D2, wherein the alkyl pyrrolidone is N-octyl-2-pyrrolidone.

D3. The acidic descaling composition of any preceding embodiment, wherein the composition lacks a wetting agent when an anionic surfactant is present in the surfactant system.

E. The acidic descaling composition of any preceding embodiment, wherein the composition further comprises a chelant.

E1. The acidic descaling composition of embodiment E, wherein the chelant comprises 0.001 to about 20 wt. % of the total composition.

E1i. The acidic descaling composition of embodiment E1, wherein the chelant comprises about 0.01 or 0.01 to 20 wt % of the total composition.

E1ii. The acidic descaling composition of embodiment E1, wherein the chelant comprises 0.01 to about 10 wt % of the total composition.

E1iii. The acidic descaling composition of embodiment E1, wherein the chelant comprises 0.01 to 10 wt % of the total composition.

E1iv. The acidic descaling composition of embodiment E1, wherein the chelant comprises 0.01 to about 4 wt % of the total composition.

E1v. The acidic descaling composition of embodiment E1, wherein the chelant comprises 0.01 to 4 wt % of the total composition.

E1vi. The acidic descaling composition of embodiment E1, wherein the chelant comprises about 0.01 to about 1 wt % of the total composition.

E1vii. The acidic descaling composition of embodiment E1, wherein the chelant comprises 0.01 to about 1 wt % of the total composition.

E1viii. The acidic descaling composition of embodiment E1, wherein the chelant comprises 0.01 to 1 wt % of the total composition.

E1ix. The acidic descaling composition of embodiment E1, wherein the chelant comprises about 0.2 wt % of the total composition.

E1x. The acidic descaling composition of embodiment E1, wherein the chelant comprises about 0.3 wt % of the total composition.

E1xi. The acidic descaling composition of embodiment E1, wherein the chelant comprises about 0.4 wt % of the total composition.

E1xii. The acidic descaling composition of embodiment E1, wherein the chelant comprises about 0.5 wt % of the total composition.

E1xiii. The acidic descaling composition of embodiment E1, wherein the chelant comprises about 0.6 wt % of the total composition.

E2. The acidic descaling composition of any embodiment E to E1xiii, wherein the chelant is methylglycine diacetic acid or a salt thereof.

E2i. The acidic descaling composition of embodiment E2, wherein the salt of methylglycine diacetic acid is a trisodium salt.

E3. The acidic descaling composition of any embodiment E to E1xiii, wherein the chelant is glucaric acid or a salt thereof.

E3i. The acidic descaling composition of embodiment E3, wherein the salt of glucaric acid is a sodium salt.

E4 The acidic descaling composition of any embodiment E to E1xiii, wherein the chelant is ethylene diamine N,N'-disuccinic acid.

E4i. The acidic descaling composition of embodiment E4, wherein the chelant is (S,S)-Ethylenediamine-N, N'-disuccinic acid.

E5. The acidic descaling composition of any embodiment E to E1xiii, wherein the chelant is L-glutamic acid N,N-diacetic acid (GLDA).

E6. The acidic descaling composition of any embodiment E to E1xiii, wherein the chelant is an amino carboxylate.

E6i. The acidic descaling composition of embodiment E6, wherein the amino carboxylate is selected from a ethylene diamine tetra acetate, diethylene triamine pentaacetate, diethylene triamine pentaacetate (DTPA), N-hydroxyethylethylenediamine triacetate, nitrilotriacetate, ethylenediamine tetrapropionate, triethylenetetraaminehexa-acetate, ethanoldiglycine, and methylglycine diacetic acid (MGDA), ethylenediaminetetraacetic acid dipotassium salt (EDTA), and glucaric acid; or a salt thereof, or a mixture thereof.

E7. The acidic descaling composition of any embodiment E to E1xiii, wherein the chelant is a phosphonate.

E7i. The acidic descaling composition of embodiment E7, wherein the phosphonate is a diethylene triamine penta methylene phosphonate (DTPMP), 1-hydroxyethylidene-1,1-diphosphonic acid (HEDP), 1,5,9-triazacyclododecane-N,N',N"-tris(methylenephosphonic acid) (DOTRP), 1,4,7,10-tetraazacyclododecane-N,N',N",N'-tetrakis(methylenephosphonic acid) (DOTP), Nitrilotris(methylene)triphosphonic acid, diethylenetriaminepentakis(methylenephosphonic acid) (DETAP), amino tri(methylenephosphonic acid), bis(hexamethylene)triamine pentamethylene phosphonic acid, 1,4,7-triazacyclononane-N, N',N"-tris(methylenephosphonic acid (NOTP), hydroxyethyldiphosphonate, nitrilotris(methylene)phosphonic acid, 2-phosphono-butane-1,2,3,4-tetracarboxylic, carboxy ethyl phosphonic acid, aminoethyl phosphonic acid, glyphosate, ethylene diamine tetra(methylenephosphonic acid) and phenylphosphonic acid; or a salt thereof.

E8. The acidic descaling composition of any embodiment E to E1xiii, wherein the chelant is a carboxylic acid.

E8i. The acidic descaling composition of embodiment E8, wherein the carboxylic acid is selected from oxalic acid, succinnic acid, aspartic acid, glutamic acid, glycine, malonic acid, maleic acid, malic acid, malonic acid, adipic acid, phthalic acid, citric acid, sodium citrate, potassium citrate, ammonium citrate, tricarballylic acid, trimethylolpropionic acid, picolinic acid, dipicolinic acid, salicylic acid sulfosalicylic acid, sulfophthalic acid, sulphosuccinic acid, Betaine, gluconic acid, tartaric acid, glucuronic acid, and 2-carboxypyridine.

E9. The acidic descaling composition of any embodiment E to E1xiii, wherein the chelant is a sulfonic acid.

E9i. The acidic descaling composition of embodiment E9, wherein the sulfonic acid is selected from 4,5-Dihydroxy-1,3-benzenedisulfonic acid disodium salt) and 2-[4-(2-hydroxyethyl)piperazin-1-yl)ethanesulfonic acid, sodium thioglycolate.

E10. The acidic descaling composition of any embodiment E to E1xiii, wherein the chelant is a nitrilotris (methylene)triphosphonic acid.

E11. The acidic descaling composition of any embodiment E to E1xiii, wherein the chelant is an iminodiacetic acid F. The acidic descaling composition of any preceding embodiment, wherein the composition further comprises one or more thickeners.

F1. The acidic descaling composition of embodiment F, wherein the thickener is in sufficient amount to increase the viscosity of the composition.

F2. The acidic descaling composition of embodiment F or F1, wherein the thickener comprises 0.01 to about 20 wt. % of the total composition.

F2i. The acidic descaling composition of embodiment F2, wherein the thickener comprises about 0.01 to 20 wt % of the total composition.

F2ii. The acidic descaling composition of embodiment F2, wherein the thickener comprises 0.01 to about 10 wt % of the total composition.

F2iii. The acidic descaling composition of embodiment F2, wherein the thickener comprises 0.01 to 10 wt % of the total composition.

F2iv. The acidic descaling composition of embodiment F2, wherein the thickener comprises 0.01 to about 4 wt % of the total composition.

F2v. The acidic descaling composition of embodiment F2, wherein the thickener comprises 0.01 to 4 wt % of the total composition.

F2vi. The acidic descaling composition of embodiment F2, wherein the thickener comprises about 0.01 to about 1 wt % of the total composition.

F2vii. The acidic descaling composition of embodiment F2, wherein the thickener comprises 0.01 to about 1 wt % of the total composition.

F2viii. The acidic descaling composition of embodiment F2, wherein the thickener comprises 0.01 to 1 wt % of the total composition.

F2ix. The acidic descaling composition of embodiment F2, wherein the thickener comprises about 0.2 wt % of the total composition.

F2x. The acidic descaling composition of embodiment F2, wherein the thickener comprises about 0.3 wt % of the total composition.

F2xi. The acidic descaling composition of embodiment F2, wherein the thickener comprises about 0.4 wt % of the total composition.

F2xii. The acidic descaling composition of embodiment F2, wherein the thickener comprises about 0.5 wt % of the total composition.

F2xiii. The acidic descaling composition of embodiment F2, wherein the thickener comprises about 0.6 wt % of the total composition.

F3. The acidic descaling composition of any one embodiment of F, F1, or F2, wherein the thickener is selected from the group consisting of a cellulose or a derivative thereof, alkyl cellulose, alkoxycellulose, hydroxyalkyl cellulose, hydroxyalkyl alkyl cellulose, carboxy alkyl cellulose, alkyl carboxy alkyl cellulose, natural polysaccharide polymer (such as xanthan gum, guar gum, Garrofin gum, tragacanth gum, or its derivatives), Microfibrillated Cellulose (MFC), polymer of polycarboxylate, polyacrylamide, and clay; or a mixture thereof.

F3i. The acidic descaling composition of F3, wherein the cellulose derivative is selected from the group consisting of methyl cellulose, ethyl cellulose, hydroxymethyl cellulose, hydroxyethyl cellulose, hydroxypropyl cellulose, carboxymethyl cellulose, carboxymethylhydroxyethylcellulose, hydroxypropylcellulose, hydroxypropylmethylcellulose, ethylhydroxymethylcellulose and ethylhydrosiethylcellulose.

F3ii. The acidic descaling composition of F3, wherein the polymer of polycarboxylate has a molecular weight of approximately 500,000 to about 4,000,000, preferably about 1,000,000 to about 4,000,000.

F3iii. The acidic descaling composition of F3 or F3ii, wherein the polymer of polycarboxylate has about 0.5% to about 4% crosslinking.

F3iv. The acidic descaling composition of F3, F3ii, or F3iii, wherein the polymer of polycaboxylate is a polyacrylate polymer.

F3v. The acidic descaling composition of F3, wherein the clay is a colloid-forming clay.

F3vi. The acidic descaling composition of F3 or F3v, wherein the clay is expandable.

F3vii. The acidic descaling composition of F3vi, wherein the expandable clay is selected from the group consisting of a smectite, montmorillonite, attapulgite, and palygorskite.

F3viii. The acidic descaling composition of any one embodiment of F, F1, or F2, wherein the thickener is a surfactant, preferable a betaine.

F4. The acidic descaling composition of any embodiment F to F3viii, wherein the composition has a viscosity range from about 10 cps fluid solution to 20,000 cps gel consistency at ambient temperature.

G. The acidic descaling composition of any preceding embodiment, wherein the composition further comprises a one or more auxiliary agents.

H. The acidic descaling composition of any preceding embodiment, wherein the non-water solvent comprises one or more glycols.

H1. The acidic descaling composition of embodiment H, wherein the one or more glycols is one or more glycol ethers.

H2. The acidic descaling composition of embodiment H, wherein the glycol comprises or consists of tripropylene glycol (CAS No. 24800-44-0).

H3. The acidic descaling composition of embodiment H1, wherein the glycol ether comprises or consists of tripropylene glycol monobutyl ether (CAS No. 55934-93-5).

H4. The acidic descaling composition of embodiment H1, wherein the glycol ether comprises or consists of polypropylene glycol monobutyl ether (CAS No. 9003-13-8).

H5. The acidic descaling composition of embodiment H1, wherein the glycol ether comprises or consists of dipropylene glycol n-butylether (CAS No. 29911-28-2).

H6. The acidic descaling composition of embodiment H, wherein the glycol is selected from the group consisting of tripropylene glycol monobutyl ether (CAS No. 55934-93-5), polypropylene glycol monobutyl ether (CAS No. 9003-13-8), tripropylene glycol (CAS No. 24800-44-0), and dipropylene glycol n-butylether (CAS No. 29911-28-2); or a mixture thereof.

H7. The acidic descaling composition of any one of embodiments H to H6, wherein the non-water solvent, glycol, or glycol ether comprises 0.05 to 20% wt. of the total composition.

H7i. The acidic descaling composition of embodiment H7, wherein the non-water solvent, glycol, or glycol ether comprises 0.1 to 10% wt. of the total composition.

H7ii. The acidic descaling composition of embodiment H7, wherein the non-water solvent, glycol, or glycol ether comprises 0.1 to about 10% wt. of the total composition.

H7iii. The acidic descaling composition of embodiment H7, wherein the non-water solvent, glycol, or glycol ether comprises 0.2 to 5% wt. of the total composition.

H7iv. The acidic descaling composition of embodiment H7, wherein the non-water solvent, glycol, or glycol ether comprises 0.2 to about 5% wt. of the total composition.

H7v. The acidic descaling composition of embodiment H7, wherein the non-water solvent, glycol, or glycol ether comprises 0.1 to about 8% wt. of the total composition.

H7vi. The acidic descaling composition of embodiment H7, wherein the non-water solvent, glycol, or glycol ether comprises 0.1 to about 5% wt. of the total composition.

H7vii. The acidic descaling composition of embodiment H7, wherein the non-water solvent, glycol, or glycol ether comprises 0.1 to 5% wt. of the total composition.

H7iii. The acidic descaling composition of embodiment H7, wherein the non-water solvent, glycol, or glycol ether comprises 0.1 to about 3% wt. of the total composition.

H7iv. The acidic descaling composition of embodiment H7, wherein the non-water solvent, glycol, or glycol ether comprises 0.1 to 3% wt. of the total composition.

H7v. The acidic descaling composition of embodiment H7, wherein the non-water solvent, glycol, or glycol ether comprises 0.1 to about 2% wt. of the total composition.

H7vi. The acidic descaling composition of embodiment H7, wherein the non-water solvent, glycol, or glycol ether comprises 0.1 to 2% wt. of the total composition.

H7vii. The acidic descaling composition of embodiment H7, wherein the non-water solvent, glycol, or glycol ether comprises 0.1 to about 1% wt. of the total composition.

H7viii. The acidic descaling composition of embodiment H7, wherein the non-water solvent, glycol, or glycol ether comprises 0.1 to 1% wt. of the total composition.

H7viv. The acidic descaling composition of embodiment H7, wherein the non-water solvent, glycol, or glycol ether comprises about 0.1 to about 0.7% wt. of the total composition.

H7x. The acidic descaling composition of embodiment H7, wherein the non-water solvent, glycol, or glycol ether comprises 0.1 to about 0.7% wt. of the total composition.

H7xi. The acidic descaling composition of embodiment H7, wherein the non-water solvent, glycol, or glycol ether comprises 0.1 to 0.7% wt. of the total composition.

H7xii. The acidic descaling composition of embodiment H7, wherein the non-water solvent, glycol, or glycol ether comprises 0.3 to 0.7% wt. of the total composition.

H7xiii. The acidic descaling composition of embodiment H7, wherein the non-water solvent, glycol, or glycol ether comprises about 0.5% wt. of the total composition.

J. The acidic descaling composition of any preceding embodiment, wherein the composition is a hard surface cleaning composition.

K. The acidic descaling composition of any preceding embodiment, wherein water comprises the balance of the wt. % of the total composition.

L. The acidic descaling composition of any preceding embodiment, wherein the composition is an industrial cleaner or is useful in a method of cleaning industrial machinery.

L1. The acidic composition of embodiment L, wherein the industrial machinery is selected from heat exchangers, cooling towers, evaporators, dishwashing machines, and ice making machines.

M. A method of cleaning industrial machinery with an acidic descaling composition of any preceding embodiment, comprising diluting the acidic descaling composition, applying directly or circulating the diluted composition through the machine, and after at least one hour, rinsing the machine with a neutralizing aqueous solution to remove soil and/or scale.

M1. The method of embodiment M, wherein the neutralizing aqueous solution is primarily water.

M1i. The method of embodiment M1, wherein the neutralizing aqueous solution is water.

M2. The method of embodiment M, wherein the at least one hour is at least two hours.

M3. The method of embodiment M, wherein the at least one hour is about 3 hours.

M4. The method of embodiment M, wherein the rinsing is pressurized rinsing.

N. A method of cleaning a hard surface with an acidic descaling composition of any preceding ready-to-use embodiment, comprising (i) applying the ready-to-use composition to a soiled hard surface, and (ii) removing the composition and soil/scale from the hard surface.

N1. The method of embodiment N, wherein step (ii) is performed 15 second to 2 minutes after step (i) is completed.

N2. The method of embodiment N or N1, wherein after step (i) and before step (ii), scrubbing the surface with a brush, sponge, or towel.

N3. The method of embodiment N, N1, or N2, wherein the step (ii) comprises wiping or rinsing the hard surface to remove the composition and soil/scale from the hard surface.

What is claimed is:

1. A descaling acidic composition comprising, an acidic component comprising one or more C1-C6 alkyl sulfonic acids, a glycol ether solvent, and a surfactant system consisting of a low foaming surfactant.

2. The descaling acidic composition of claim 1, wherein the one or more C1-C6 alkyl sulfonic acids comprises methanesulfonic acid.

3. The descaling acidic composition of claim 1, wherein the composition further comprises an organic acid selected from the group consisting of lactic acid, formic acid, butyric acid, valeric acid, caproic acid, itaconic acid, oxalic acid, terephthalic acid, citric acid, acetic acid, malonic acid, maleic acid, succinic acid, hydroxyl succinic acid, adipic acid, octanoic acid, fumaric acid, itaconic acid, methacrylic acid, sulfamic acid, methylsulfamic acid, propionic acid, gluconic acid, glutamic acid, glutaric acid, glucaric acid, benzoic acid, tartaric acid, hydroxyacetic acid, and salicylic acid; or a mixture thereof.

4. The descaling acidic composition of claim 1, wherein the acidic component comprises about 0.1 to about 45 wt. % of the total composition.

5. The descaling composition of claim 1, wherein the low foaming surfactant comprises one or more anionic surfactants, one or more nonionic surfactants, one or more amphoteric surfactants, or a mixture thereof.

6. The descaling composition of claim 5, wherein the anionic surfactant comprises an alkyl sulfate.

7. The descaling composition of claim 5, wherein the nonionic surfactant comprises an alcohol ethoxylate.

8. The descaling composition of claim 7, wherein the alcohol ethoxylate comprises an alkyl chain of C6, C7, C8, or C9, or a mixture thereof.

9. The descaling composition of claim 8, wherein the ratio of the acidic component relative to the surfactant system is between 200:1 to 300:1.

10. The descaling composition of claim 1, wherein the composition further comprises a wetting agent.

11. The descaling composition of claim 10, wherein the wetting agent comprises 0.01 to about 5 wt. % of the total composition.

12. The descaling composition of claim 10, wherein the wetting agent comprises an alkyl pyrrolidone.

13. The descaling composition of claim 12, wherein the alkyl pyrrolidone comprises N-octyl-2-pyrrolidone.

14. The descaling composition of claim 1, wherein the composition further comprises a chelant.

15. The descaling composition of claim 14, wherein the chelant comprises methylglycine diacetic acid or a salt thereof, glucaric acid or a salt thereof, or a mixture thereof.

16. The descaling composition of claim 15, wherein the salt of methylglycine diacetic acid is a trisodium salt.

17. The descaling composition of claim 15, wherein the chelant comprises methylglycine diacetic acid and the methylglycine diacetic acid comprises about 0.01 to about 1 weight percent of the total composition.

18. The descaling composition of claim 1, wherein the glycol ether solvent is selected from the group consisting of tripropylene glycol monobutyl ether, polypropylene glycol monobutyl ether, tripropylene glycol, and dipropylene glycol n-butyl ether; or a mixture thereof.

19. The descaling composition of claim 1, wherein the composition further comprises one or more thickeners.

20. A descaling acidic composition consisting essentially of:

methanesulfonic acid, and optionally, an additional acidic component;

a glycol ether solvent;

a surfactant system comprising a nonionic surfactant having an alkyl chain of C6, C7, C8, or C9; and optionally, a chelating agent, a thickening agent, or both.

21. The descaling acidic composition of claim 20, further comprising a wetting agent.

22. A descaling acidic composition comprising:

an acidic component comprising one or more C1-C6 alkyl sulfonic acids;

a glycol ether solvent; and a surfactant system comprising an alcohol ethoxylate having an alkyl chain of C6, C7, C8, or C9.

23. The descaling acidic composition of claim 22, wherein the glycol ether solvent is selected from the group consisting of tripropylene glycol monobutyl ether, polypropylene glycol monobutyl ether, tripropylene glycol, and dipropylene glycol n-butylether; or a mixture thereof.

* * * * *